United States Patent [19]
Zarybnicky, Sr. et al.

[11] Patent Number: 5,640,894
[45] Date of Patent: Jun. 24, 1997

[54] METHOD OF ASSEMBLY FOR TAMPER-RESISTANT BRAKE ACTUATOR

[75] Inventors: Richard F. Zarybnicky, Sr.; Ronald S. Plantan, both of Charlotte, N.C.

[73] Assignee: Indian Head Industries, Inc., Charlotte, N.C.

[21] Appl. No.: 567,567

[22] Filed: Dec. 5, 1995

[51] Int. Cl.$^6$ ................................................. F01B 31/00
[52] U.S. Cl. ................................. 92/164; 92/63; 92/128; 29/888.06
[58] Field of Search ........................... 92/128, 164, 63; 29/888.06, 890.09

[56] References Cited

U.S. PATENT DOCUMENTS

| | | |
|---|---|---|
| 3,218,796 | 11/1965 | Fites . |
| 3,302,530 | 2/1967 | Dobrikin et al. ........................ 92/63 |
| 3,401,606 | 9/1968 | Matthews et al. . |
| 3,431,031 | 3/1969 | Ike . |
| 3,509,795 | 5/1970 | Woodward . |
| 3,613,515 | 10/1971 | Swnader, Jr. et al. . |
| 3,813,994 | 6/1974 | Swander, Jr. et al. . |
| 3,826,176 | 7/1974 | Ike . |
| 3,842,716 | 10/1974 | Swander, Jr. . |
| 3,908,520 | 9/1975 | Ma . |
| 3,994,205 | 11/1976 | Ekdahl et al. . |
| 4,080,875 | 3/1978 | Repolovsky et al. . |
| 4,729,290 | 3/1988 | Ewald et al. . |
| 4,887,513 | 12/1989 | Ewald et al. . |
| 5,094,143 | 3/1992 | Anderson, Jr. ........................... 92/164 |

Primary Examiner—Thomas E. Denion
Attorney, Agent, or Firm—Howard & Howard

[57] ABSTRACT

In a method of forming tamper-resistant brake actuators, the ports for connecting air pressure sources to apertures within the central housing of the brake actuator are bolted to the central housing after the brake housing members have been inelastically deformed together. In this way, the deformation tools utilized to deform the housing members will not contact the air pressure ports. In the past, brake actuators have required spacing the deformation tools from the ports to avoid damaging the ports. This has required that the central housing be undesirably long. With the inventive method, the deformation is performed prior to attachment of the ports. Thus, the axial length of the central housing may be greatly reduced over the prior art. Once the deformation is completed, the ports are then bolted to the central housing. In this way, the length of the central housing and the amount of material required by the central housing are greatly reduced.

16 Claims, 3 Drawing Sheets

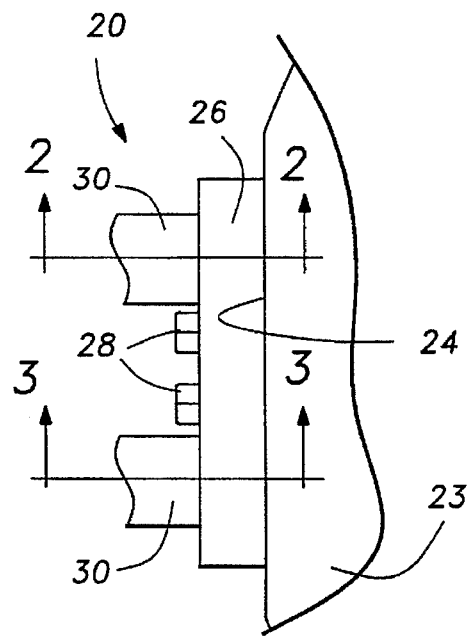
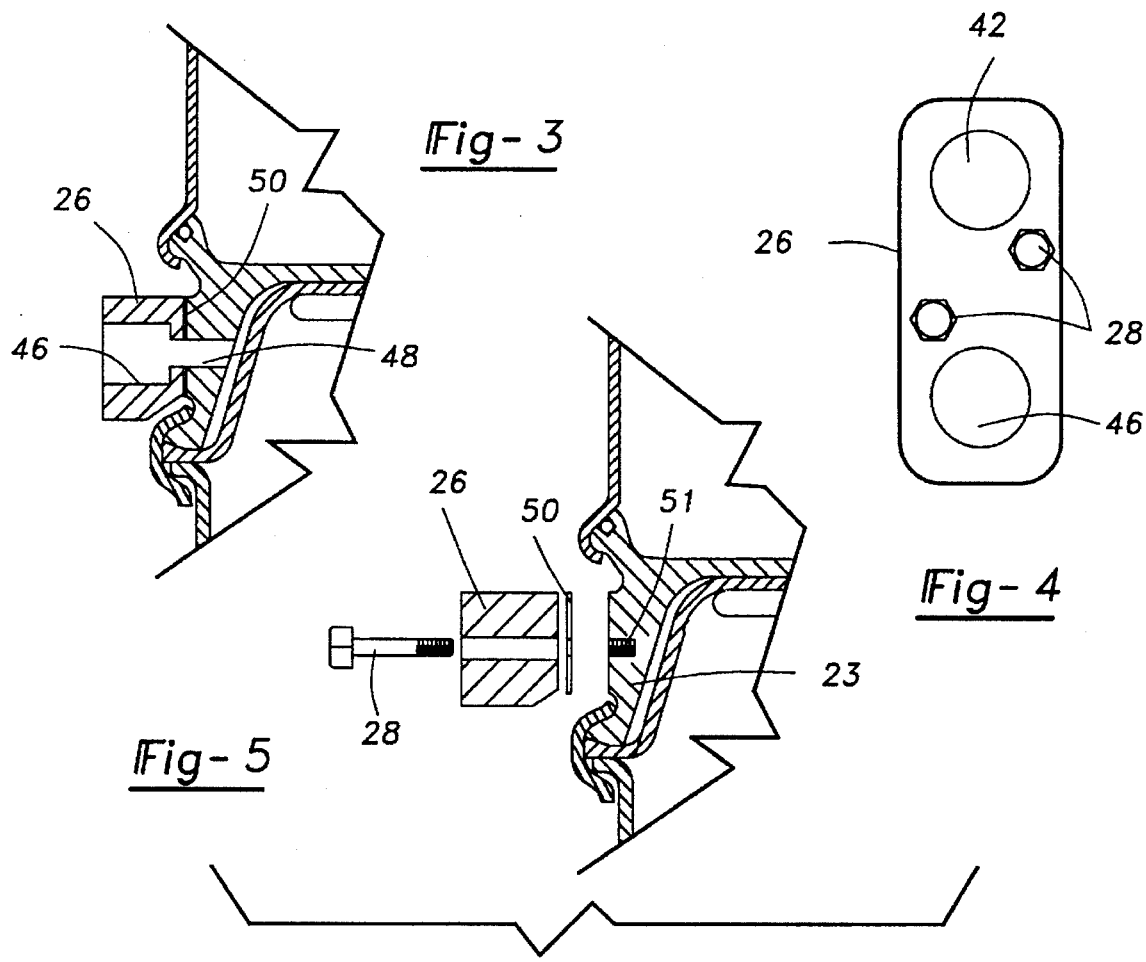

METHOD OF ASSEMBLY FOR TAMPER-RESISTANT BRAKE ACTUATOR

BACKGROUND OF THE INVENTION

This invention relates to an improvement in the assembly of spring brake actuators.

Spring brake actuators have traditionally included housing members that are connected together by bolted clamp bands. Piston type spring brake actuators have typically included an outer housing member connected to a central housing member by a removable clip, or other holding structure.

More recently, brake actuators have included housings that are connected together by inelastically deformed portions that prevent opening of the prior bolted clamp bands. The inelastically deformed type of brake actuators have enjoyed wide commercial success, and have become standard in the industry. Other types of tamper resistant brake actuators have been also been proposed.

There are some aspects of the tamper-resistant spring brake actuators that could be improved, however. One such aspect is the method of deforming the housing members together. In the prior art, a central housing has typically been formed with a port for connection to a source of pressurized air. The ports have typically extended radially outwardly of the nominal body of the central housing. The tools which inelastically deform the housing members have typically moved into contact to deform a housing member. Typically an outer end of the housing member to be deformed has been deformed radially inwardly. The central housing has been formed of a minimum axial length for this type of brake actuator, as it has been necessary to ensure that the tools which deform the housing members do not come into contact with the ports. If the deforming tools do contact the ports, damage can occur. Thus, the prior art spring brake actuators which have utilized deformed housings have included central housing members of an undesirably long length.

SUMMARY OF THE INVENTION

The instant invention improves upon the prior art spring brake actuators by utilizing removable ports. The housing members are deformed together initially, with the ports not yet connected to the central housing member. Thus, there is no concern that a deforming tool may contact or damage the ports.

A planar portion of the central housing is formed that is spaced radially inwardly from the location of the deformation of the housing members. When the deformation tools deform the housing member, there is no danger of those deformation tools contacting the ports. Once the deformation is complete, the ports may then be connected.

In one embodiment, the ports for both a service chamber and a spring chamber on the spring brake actuator are connected as a single item, and are formed as an integral one-piece body. This integral one-piece body is preferably bolted to the planar portion on the central housing. A gasket is preferably compressed between the port and the central housing.

These and other features of the present invention will be best understood from the following specification and drawings, of which the following is a brief description.

BRIEF DESCRIPTION OF THE DRAWINGS

FIG. 1 is a top view of a portion of a spring brake actuator incorporating the present invention.

FIG. 3 is a cross-sectional view along line 3—3 as shown in FIG. 1.

FIG. 4 is an end view of a port body.

FIG. 5 shows the connection of the port body to the central housing of the brake actuator.

DETAILED DESCRIPTION OF A PREFERRED EMBODIMENT

Figure 2:
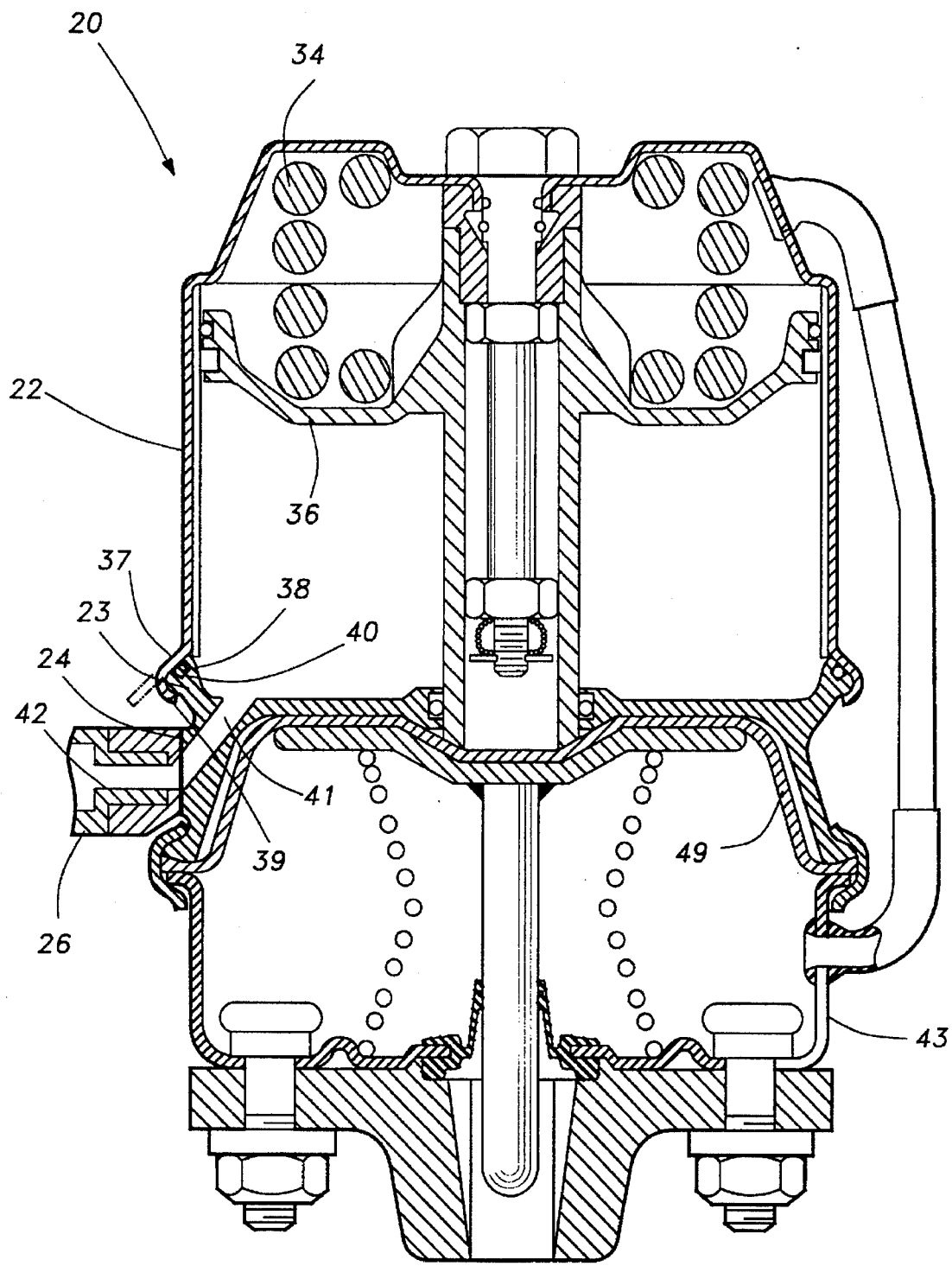
FIG. 2 is a cross-sectional view through a spring brake actuator along line 2—2 of FIG. 1.

A spring brake actuator 20 is illustrated in FIGS. 1 and 2. An outer housing 22 is connected to a central housing 23 in a manner that prevents removal of the connection. Planar portion 24 is formed on the central housing 23. The central housing 23 is generally cylindrical and centered on a central axis of the brake actuator. Planar portion 24 is formed as a planar reduced portion on the cylindrical outer surface.

As shown, a port housing 26 is bolted at 28 to the planar portion 24. Port 26 is connected to hoses 30 to supply pressurized air to the broke actuator for actuation of the brake actuator.

As shown in FIG. 2, the outer housing 22 is connected to the central housing 23 by a deformed connection. The brake actuator 20 is shown as a piston-type brake actuator including a power spring 34 selectively moving a piston member 36. As shown, the deformed connection 37 compresses o-ring 38, and includes an outer end 39 bent radially inwardly about a rim 40 of the central housing 23. The one-piece port body 26 includes an opening 42 for communicating air from source 30 through an aperture 41, and into a chamber beneath the piston 36. As is known, this pressurized air compresses the power spring 34 by holding the piston 36 upwardly as shown in this figure. A second chamber is formed beneath the central housing 23 by connection of a service chamber housing 43. Diaphragm 44 is held between the two housings.

As can be seen between FIGS. 1 and 2, planar portion 24 is formed by removing the material from the otherwise generally cylindrical central housing 23. That is, the planar portion 24 is formed as a reduction of the nominal outer diameter of the central housing 23, rather than as an addition. This further reduces the likelihood that any structure for supplying pressurized air to the chambers within the brake actuator will be contacted by a deformation tool, as will be described below. In addition, the deformed portion of the brake actuator is at an outer diameter that is greater than the outer diameter of the planar portion. Again, this increases the likelihood that the deformation tool will not contact any of the connections structure.

As shown in FIG. 3, one-piece port housing 26 includes a second port 46 communicating pressurized air from source 32 through aperture 48 and into the service chamber housing. As shown, a gasket 50 is compressed between the port housing 26 and the central housing 23. Although it is preferred that the central housing 23 and port body 26 be formed as cast aluminum parts, it is possible that one or the other can be formed of steel or other suitable materials. Also port body 26 may be extruded.

As shown in FIG. 4, the one-piece port body 26 receives bolts 28, and includes the openings 42 and 46 as described above.

As shown in FIG. 5, the one-piece housing 26 is attached to the central housing 23 by connecting into bolt holes 51.

Figure 6A:
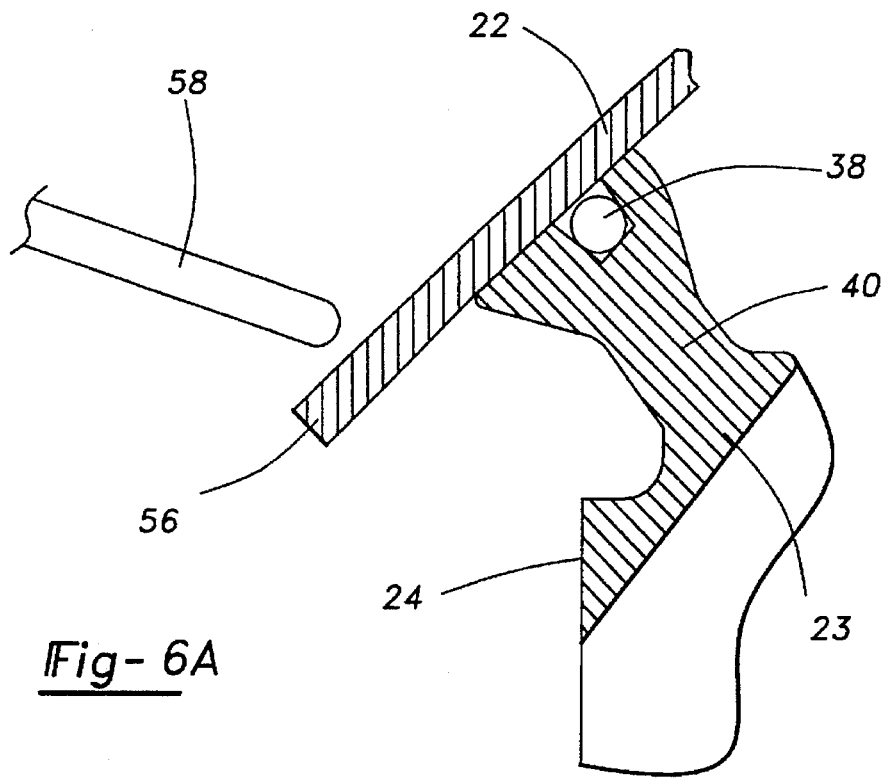
FIG. 6A shows the first step in the deformation of the brake actuator.
Figure 6B:
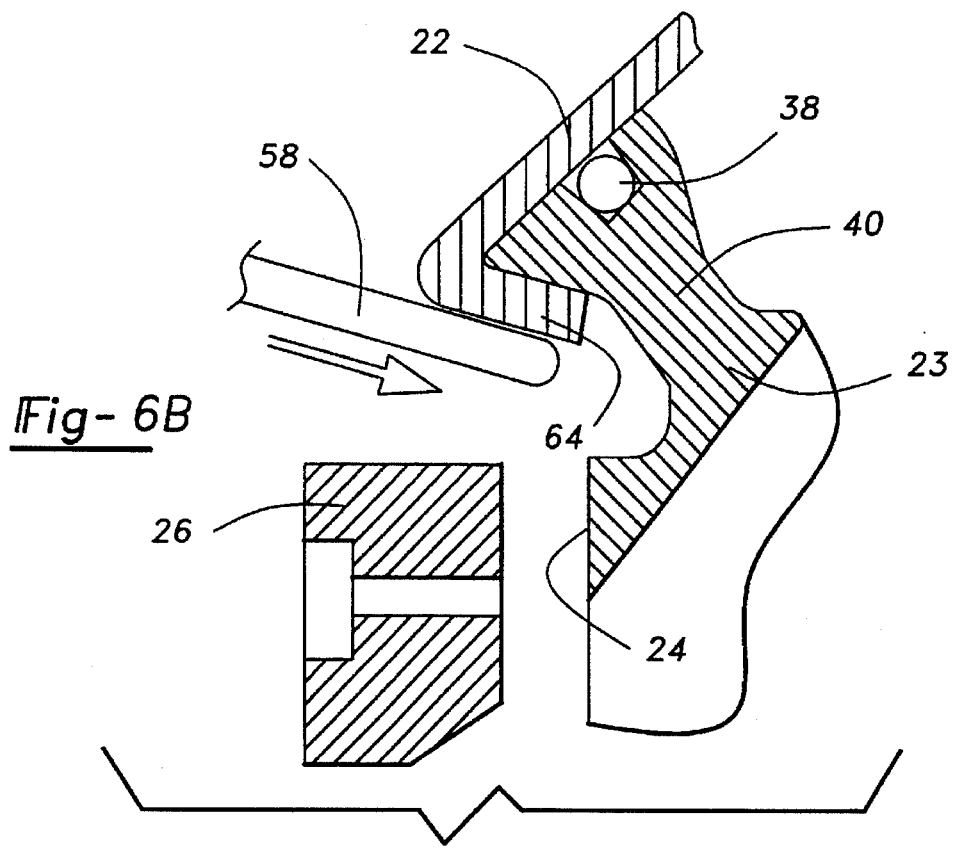
FIG. 6B shows the subsequent step in the deformation of the brake actuator.

In a method according to the present invention, the one-piece body 26 is removed from the central housing 23 when the deformation of the connection 37 is initially performed. As shown in FIG. 6A and 6B, the deformation includes the use of deformation tools that move about the surface of the central housing. Since the one-piece port body 26 is not attached to the central housing 23 during the steps shown in FIG. 6A and 6B, the overall axial length of the central housing 23 may be greatly reduced.

As shown in FIG. 6A, the flat portion 24 has not yet received the one-piece port body 26. The outer housing 22 is formed with an outwardly extending skirt 56. A deformation tool 58, which may be a spinning tool or any other known machining tool for deforming metal, initially deforms the skirt 56 axially and radially inwardly as shown at 64 in FIG. 6B. This then completes the deformation of the outer housing 22 to the central housing 23. It should also be understood that although the outer housing 22 is deformed onto the central housing 23, in some operations the central housing 23 may be deformed to the outer housing.

Once the deformation shown in FIG. 6A and 6B is complete, then the one-piece port 26 may be attached to the central housing 23. In this way, it is not necessary to provide axial length to the central housing 23 to prevent the deformation tool 58 from contacting the ports and damaging the ports.

The present invention provides a central housing that may be of a reduced axial length when compared to prior art brake actuators, and thus, improves upon the prior art. Although the specific embodiment shown in the illustrations is a piston brake actuator, it should be understood that this invention would have benefits in dual diaphragm brake actuators, and in stand alone brake actuators such as service chambers.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. A method of forming a tamper-resistant brake actuator comprising the steps of:

(a) providing a central housing and an outer housing, said central housing having a aperture for communicating pressurized air to a chamber defined between said central housing and said outer housing;

(b) inelastically deforming one of said outer housing and said central housing relative to the other to secure said housings together; and (c) then connecting a port body to said central housing to facilitate connection of pressurized air source to said aperture.

2. A method as recited in claim 1, wherein said central housing is part of a dual chamber brake actuator, and said central housing having apertures communicating air to chambers above and below said central housing, said port body having separate connections for each of said apertures.

3. A method as recited in claim 2, wherein said central housing is generally cylindrical, but including a relatively planar surface for receiving said port body.

4. A method as recited in claim 3, wherein a gasket is positioned between said port body and said planar portion.

5. A method as recited in claim 4, wherein both of said connections are formed within a one-piece post body.

6. A method as recited in claim 5, wherein said one-piece port body is bolted to said planar portion, compressing said gasket.

7. A method as recited in claim 3, wherein said planar portion is at a position spaced from a central axis of said brake actuator by a distance that is smaller than the distance to said deformed portion of said housing.

8. A method as recited in claim 1, wherein said central housing is a cast member, and said port body is also cast.

9. A method as recited in claim 1, wherein said brake actuator chamber includes a power spring actuating a piston member for selective actuation of a brake.

10. A method as recited in claim 1, wherein said central housing includes an annular rim, and said outer housing is inelastically deformed around said annular rim to secure said outer housing to said central housing.

11. A method as recited in claim 1, wherein said port body includes a threaded connection to connect a source of pressurized air.

12. A spring brake actuator comprising a first housing including at least one aperture for selectively communicating pressurized air to a chamber defined in part by said first housing:

a second housing connected to said first housing by a tamper-resistant connection, wherein one of said first of said houses is inelastically deformed around the other to provide said tamper-resistant connection; and said first housing including a connection for communicating pressurized air to said chamber, said connection being removably attached to said first housing after the tamper-resistant connection of said first and second housings, said first housing being a central housing of a dual chamber brake actuator, and said central housing including apertures extending to chambers both above and below said central housing, a connection being removably attached to said first housing and leading to each of said apertures.

13. A brake actuator as recited in claim 12, wherein said first housing is generally cylindrical, and a planar portion is formed on said central housing for receiving said connections.

14. A brake actuator as recited in claim 13, wherein ports for both of said apertures are connected to said planar portion as a one-piece part.

15. A brake actuator as recited in claim 14, wherein a gasket is compressed between said one-piece part and said planar portion.

16. A brake actuator as recited in claim 15, wherein said one-piece part is bolted to said central housing.

* * * * *